United States Patent [19]
Christiansen

[11] 4,312,147
[45] Jan. 26, 1982

[54] ARRANGEMENT IN AN AUTOMATIC ANGLING MACHINE

[76] Inventor: Thorbjørn Christiansen, 8400 Sortland, Norway

[21] Appl. No.: 132,840

[22] Filed: Mar. 24, 1980

[30] Foreign Application Priority Data

Mar. 28, 1979 [NO] Norway .................................. 791021
Dec. 27, 1979 [NO] Norway .................................. 794286

[51] Int. Cl.$^3$ .............................................. A01K 91/02
[52] U.S. Cl. .......................................... 43/15; 43/27.4; 242/189
[58] Field of Search .................. 43/4, 6.5, 15, 27.2, 43/27.4; 137/355.16, 355.2, 355.27; 242/56.9, 84.52 R, 84.52 B, 117, 157 R, 157 C, 157.1, 189; 254/134.3 SC, 280; 191/12.2 R, 12.2 A

[56] References Cited

U.S. PATENT DOCUMENTS

| 2,108,111 | 2/1938 | Ehrlich | 191/12.2 R X |
| 2,735,207 | 2/1956 | Christiansen | 43/15 |
| 3,049,829 | 8/1962 | Clapp | 43/6.5 |
| 3,589,641 | 6/1971 | Lawrence | 242/157.1 |
| 3,696,545 | 10/1972 | Gudjonsson | 43/15 |
| 3,903,632 | 9/1975 | Tison et al. | 43/27.4 X |
| 4,045,195 | 8/1977 | Drummond | 242/157 R X |
| 4,087,060 | 5/1978 | Laky et al. | 242/117 X |

FOREIGN PATENT DOCUMENTS 1025415  4/1966  United Kingdom .................... 43/15

*Primary Examiner*—Stephen G. Kunin
*Assistant Examiner*—Robert P. Olszewski
*Attorney, Agent, or Firm*—Scully, Scott, Murphy & Presser

[57] ABSTRACT

In an automatic angling machine of the type comprising a line reel driven by a motor through a clutch device, and which may be used for jigging and bobbing type of fishing with automatic reversal of the movement direction of the fishing line and for automatic hauling by increased line load, there is provided a drum which is mounted next to and as an extension of the line reel, which drum is provided with a helical line-guiding groove which is adapted to receive the portion of the fishing line comprising angles or drags, a line guide being provided in association with the drum and being adapted to guide the line from the line reel onto said drum when actuated by an element which is attached to the fishing line.

4 Claims, 4 Drawing Figures

ARRANGEMENT IN AN AUTOMATIC ANGLING MACHINE

The present invention relates to an arrangement in an automatic angling machine of the type comprising a line reel driven by a motor through a clutch device, and which may be used for jigging and bobbing type of fishing with automatic reversal of the movement direction of the fishing line and for automatic hauling by increased line load.

Such an angling machine or so-called jigging machine, having a line reel driven by an electric motor through a magnetic clutch, is e.g. known from U.S. Pat. No. 3,365,833 which is hereby incorporated by reference. The existing automatic jigging machines stop when the angles arrive at the water surface, so that the fish must be taken onboard manually, or the line runs immediately out again if there is no load on the line.

In e.g. cuttlefish or squid fishery and in fishing of some smaller fish species, such as mackerel, it would be desirable that the angling or fishing machine could bring the catch onboard the fishing vessel and loosen it from the angles or the grapnels or drags without manual assistance. To use a single fishing line with several angles does not work, as the angles would hook onto the line on the reel.

There are previously known special machines for fishing of cuttlefish or squid (ommatostrephes sagittatus), wherein a line drum with a length of approximately 30 cm during rotation also goes back and forth and thus distributes the line and the angles or the drags on the line drum. However, such a solution can hardly be adapted to and utilized on the existing fishing or jigging machines.

Thus, the object of the invention is to provide an arrangement in an angling machine of the type set forth above enabling that the angling machine can bring the catch onboard and further release the angles or drags from the catch without manual assistance.

The above mentioned object is achieved with an arrangement which, according to the invention, is characterized in that a drum with a helical line-guiding groove is mounted in the extension of the line reel, said groove being adapted to receive the portion of the fishing line comprising angles or drags, a line guide being provided in association with the drum and being adapted to guide the line from the line reel onto the helical drum when actuated by an element attached to the fishing line.

The invention will be described more closely in the following in connection with exemplary embodiments with reference to the accompanying drawings, wherein.

Figure 3:
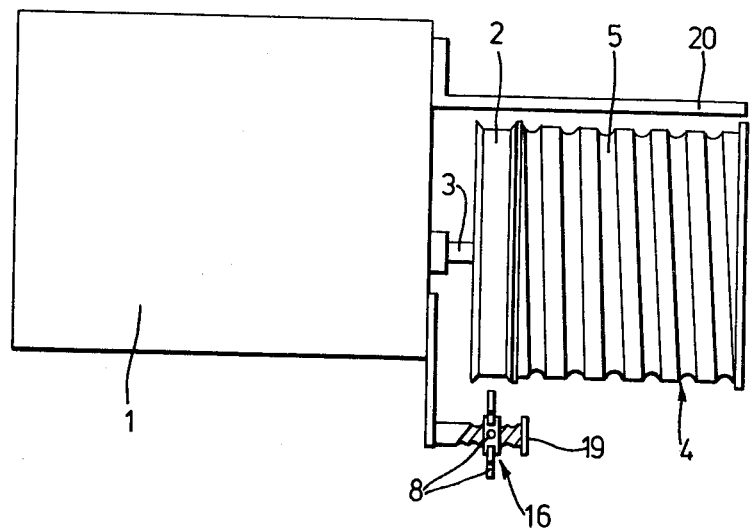
FIG. 3 shows a similar view as in FIG. 1 of an angling machine with a second embodiment of the arrangement according to the invention.
Figure 4:
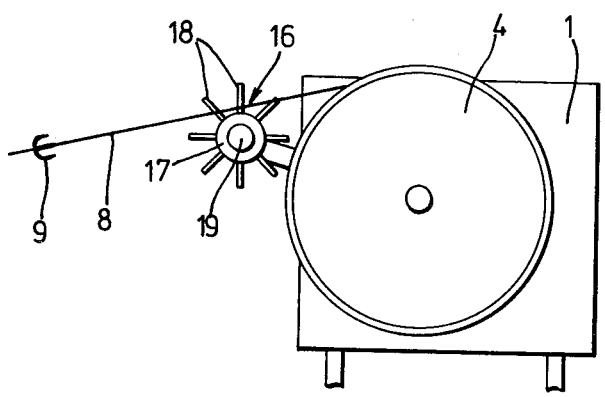

and FIG. 4 shows an end view of the arrangement in FIG. 3.

Figure 1:
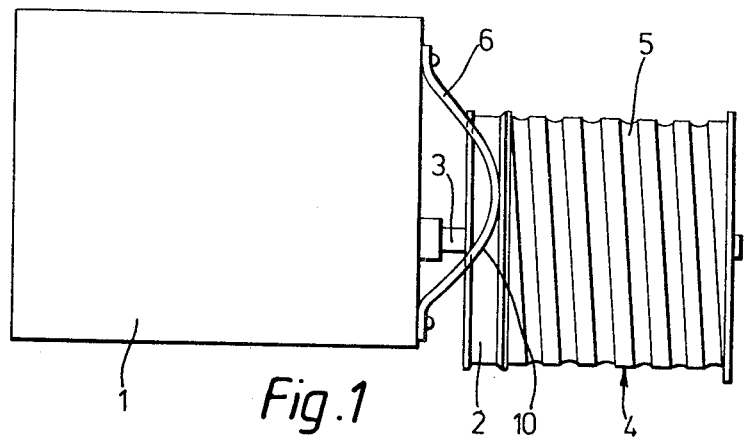
FIG. 1 shows a schematic plan view of an angling machine with a first embodiment of the arrangement according to the invention.

In FIG. 1 there is quite schematically shown an angling machine 1 with a non-encased winder or line reel 2 which is mounted on reel shaft 3. A drum 4 having approximately the same diameter as the reel 2 and a length which in practice may be about 30 cm, is mounted on the reel shaft 3 next to and as an extension of the reel. Along its surface the drum is provided with a helical groove 5 with suitable depth and pitch for guiding of the line during hauling thereof after that it has been carried from the line reel 3 to the helical drum 4 by means of a line guide 6. In the illustrated embodiment the line guide forms a leading means for an element or a body 7 (FIG. 2) which is placed on or attached to the fishing line 8 before the first hook or drag 9 on the line. The shown leading or guiding means is in the form of a curved plate or screen which has a leading wall 10 for the line body 7, and it is mounted on the angling machine housing 1 above the line reel 2, i.e. where the line 8 runs onto or out from the reel. Conveniently, the line body is ovoid or spherical and projects sufficiently laterally from the line 8 so that the body and thus also the following hook line is transferred to the helical drum 4 when the body 7 passes the leading means 6 and is thus carried along its leading wall 10.

Figure 2:
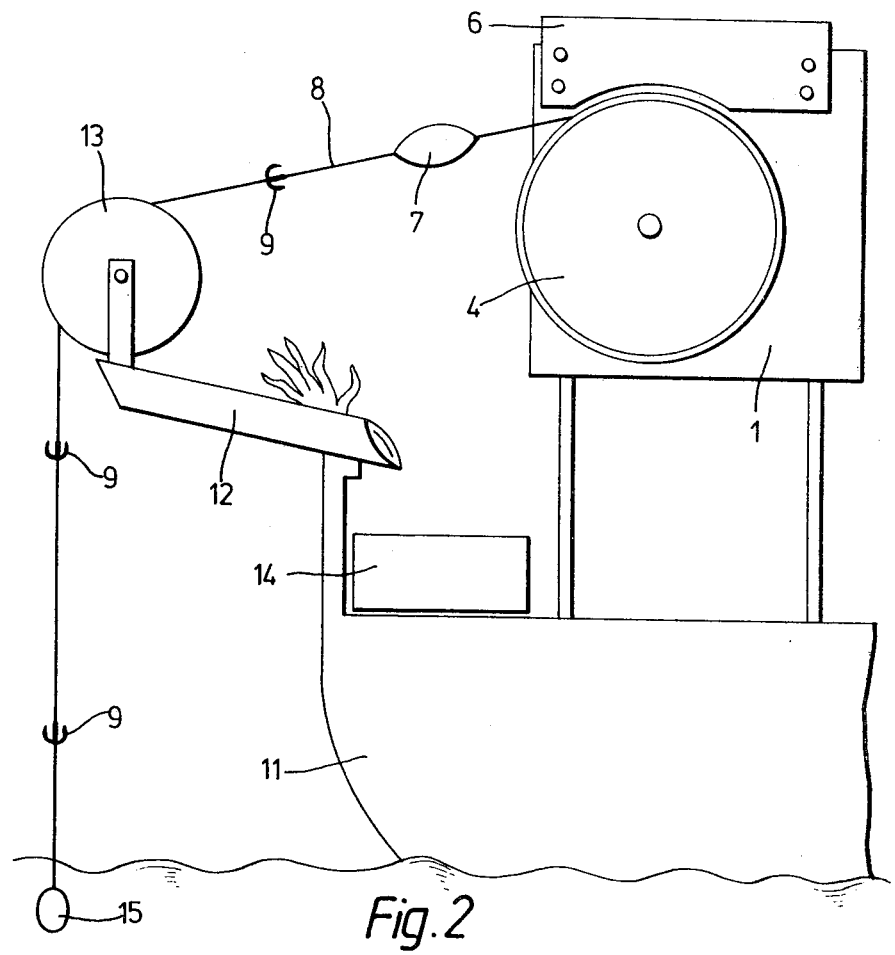
FIG. 2 shows an end view of the angling machine and the arrangement of FIG. 1 installed on a fishing vessel in connection with a line guide roller and a chute for guiding of the taken-up catch.

In FIG. 2 an angling machine with the described embodiment of the device according to the invention is shown installed on a fishing vessel 11. On the rail of the vessel there is in a known manner attached an outwardly projecting channel or chute 12 having a reel-shaped line guide roller 13 over which the line 8 and the catch is running. As long as the angling machine during hauling of the line 8 is pulling in the main line, this is wound on the line reel 2. However, when the line body 7 comes in and is carried along the leading wall 10 of the line guide, the line is carried over onto the groove in the helical drum 4 where the line then continues along the groove 5 so that the angles or drags in this manner are kept separate from each other on the drum. The catch in the form of e.g. cuttlefish will fall off and into the chute 12 as the drags 9 are without barbs, and from the chute slide downwards into a box or case 14 for collection of the catch. When the top point set on the angling machine has been achieved, the sinker 15 at the end of the fishing line will pull this out again.

In FIGS. 3-4 there is shown another embodiment of the device according to the invention, wherein the line guide 16 consists of a relatively small wheel 17 having a plurality of thin pins or rods 18 extending radially outwards from the wheel and being distributed around at least a portion of the circumference of the wheel. The wheel 17 is rotatably mounted on a helical spindle 19 attached to the angling machine casing 1, so that the wheel is moved axially on the spindle 19 in the direction towards the helical drum 4 when the wheel is rotated as a result of the fact that an element, such as an angle or a drag 9, attached to the line 8 hooks onto a rod 18 on the line guide wheel during hauling of the line.

When the first drag 9 during hauling of the line 8 actuates the line guide 16, this is as mentioned moved axially and pushes the line onto the helical drum 4 on which the line continues along the groove 5 and keeps the angles or drags separated from each other. As previously mentioned, the line sinker pulls the line out again when the set or adjusted top point of the angling machine is achieved, and the first drag, which may possibly have the hooks directed in the opposite direction, actuates the line guide 16 which then returns to its initial position. As mentioned above, the catch in the form of e.g. cuttlefish will fall off and into the chute 12 (FIG. 2). If e.g. mackerel is fished, a rod 20 (FIG. 3) is presupposed to be mounted parallel to the helical drum 4, so that the fish is torn off the angles.

As regards the construction of the line guide, several different solutions are possible in addition to the described embodiments. For example, the line guide may be operated by a solenoid or a motor which is activated by means of a magnetic switch actuated by a magnet attached to the line. In an embodiment of the angling machine wherein this is electronically controlled and has a scaler (counters) showing fishing depths, etc., the line guide may further be adapted to be activated by means of the scaler of the angling machine, the scaler at a suitable setting e.g. actuating a switch which in turn starts a drive means for the line guide.

Further, the line guide may be mounted e.g. adjustably or resiliently movable relatively to the line reel, so that its position may be adapted to e.g. the line quantity which in a given case is on the reel when the line guide is to begin functioning.

In use of an angling machine of the stated type which is provided with the arrangement or device according to the invention, the operational sequence will thus be as follows: The machine is set on the appropriate depth, with continuous movement upwards until the last angle or drag has passed over the line guide roller. Cuttlefish or fish is automatically released or loosened from the drags or angles which in turn lie down on the helical groove drum. When the line has reached the "top point" set on the machine, the sinker pulls the line out again. Thus, one person may theoretically be fishing with up to ten or more lines without having anything else to do but shifting fish boxes successively as these are filled.

What I claim is:

1. In an automatic angling machine of the type comprising a line reel driven by a motor through a clutch device, and which may be used for jigging and bobbing type of fishing with automatic reversal of the movement direction of the fishing line and for automatic hauling by increased line load, the improvement comprising;
   a drum mounted next to and as an extension of the line reel, said drum having a helical line-guiding groove which is adapted to receive the portion of the fishing line comprising angles or drags, a line guide being provided in association with the drum and being adapted to guide the line from the line reel onto the helical drum when contacted by an element attached to the fishing line.

2. Arrangement according to claim 1, wherein the line guide comprises a leading means disposed above the line reel, and the element attached to the line is a body extending laterally from the line so that the line is transferred to the helical drum when the body passes the leading means.

3. Arrangement according to claim 2, wherein the leading means forms a leading wall projecting outwardly above the line reel, and the element attached to the line is an essentially spherical or ovoid body.

4. Arrangement according to claim 1, wherein the line guide consists of a wheel which is rotatably mounted for axial movement on a helical spindle, and which comprises a plurality of outwards projecting arms adapted to be actuated by the element attached to the line.

* * * * *